US009444237B2

(12) United States Patent
Frojo

(10) Patent No.: US 9,444,237 B2
(45) Date of Patent: Sep. 13, 2016

(54) CABLE MANAGEMENT APPARATUS AND METHOD

(71) Applicant: ROSS VIDEO LIMITED, Iroquois, Ontario, CA (US)

(72) Inventor: Jean Emmanuel Frojo, Ottawa (CA)

(73) Assignee: ROSS VIDEO LIMITED, Ontario (CA)

( * ) Notice: Subject to any disclaimer, the term of this patent is extended or adjusted under 35 U.S.C. 154(b) by 108 days.

(21) Appl. No.: 14/506,987

(22) Filed: Oct. 6, 2014

(65) Prior Publication Data
US 2016/0099556 A1 Apr. 7, 2016

(51) Int. Cl.
H02G 3/22 (2006.01)
H02G 1/06 (2006.01)
H02G 3/30 (2006.01)

(52) U.S. Cl.
CPC .................. *H02G 3/30* (2013.01); *H02G 1/06* (2013.01); *H02G 3/22* (2013.01)

(58) Field of Classification Search
CPC .......... H02G 3/22; H02G 3/24; H02G 3/263; H02G 3/30; H02G 3/36; H02G 1/06
USPC ............. 174/68.1, 68.3, 135, 72 A; 385/134, 385/135; 248/49, 68.1
See application file for complete search history.

(56) References Cited

U.S. PATENT DOCUMENTS

| 4,971,271 A * | 11/1990 | Sularz ..................... F16L 3/223 248/68.1 |
| 6,170,784 B1 * | 1/2001 | MacDonald ......... H05K 7/1448 248/68.1 |
| 6,702,237 B2 * | 3/2004 | Rubenstein ............. F16L 3/003 248/49 |
| 7,205,481 B2 * | 4/2007 | Higbie ..................... H02G 3/32 174/72 A |
| 7,352,947 B2 * | 4/2008 | Phung .................. G02B 6/4459 248/49 |
| 7,446,260 B2 * | 11/2008 | Hammonds ............ B65H 75/06 174/135 |
| 7,619,164 B2 * | 11/2009 | Caveney .............. H01R 9/2416 174/135 |
| 7,952,027 B2 * | 5/2011 | Grelck ..................... H02G 3/32 174/68.1 |
| 8,565,573 B2 * | 10/2013 | Zheng ..................... H02G 3/32 174/135 |
| 8,590,847 B2 * | 11/2013 | Guthke .................... H02G 3/32 174/68.1 |
| 8,998,151 B2 * | 4/2015 | Hoek ..................... F16L 3/223 248/68.1 |
| 9,042,702 B2 * | 5/2015 | Rodriguez ............... G02B 6/36 385/134 |

* cited by examiner

*Primary Examiner* — Angel R Estrada
(74) *Attorney, Agent, or Firm* — Nixon Peabody LLP; Jeffrey L. Costellia

(57) ABSTRACT

Cable management apparatuses and related methods for managing a plurality of cables are provided. In one embodiment, there is disclosed a cable management apparatus having a body with a plurality of grooves. Each groove of the plurality of grooves is for receiving therein a portion of at least one cable. The body also has a plurality of cavities. Each cavity of the plurality of cavities is for receiving a portion of at least one securing member for securing the at least one cable to the body.

20 Claims, 13 Drawing Sheets

CABLE MANAGEMENT APPARATUS AND METHOD

FIELD

This application relates to an apparatus for managing a plurality of cables, such as cables connected to electronic equipment.

BACKGROUND

Some pieces of equipment have many cables connected thereto (e.g. for power, Ethernet, communication with other devices, etc.). These cables can sometimes become entangled or in the way, which may cause a cable to be accidentally hit by a human or an object. In such a situation, a cable may also accidentally be pulled away from its point of connection on the equipment.

It is known to use cable ties to secure a cable to either the equipment itself or to a chassis or other structure in which (or on which) the equipment is located. However, securing a cable in this way may not be optimal or easily achievable in some applications. For example, it may be hard to manage if there are many cables and/or limited space on the equipment or chassis housing the equipment. Also, securing a cable in this way may result in the cable becoming bent too much (i.e. too small of a radius of curvature), which places stress on the cable or the point at which the cable connects to the equipment.

SUMMARY

Cable management apparatuses and related methods are disclosed herein.

According to one embodiment, there is provided a cable management apparatus comprising a body having a plurality of grooves. Each groove of the plurality of grooves is for receiving therein a portion of at least one cable. The body also has a plurality of cavities. Each cavity of the plurality of cavities is for receiving a portion of at least one securing member for securing the at least one cable to the body.

In some embodiments, between each pair of neighbouring grooves of the plurality of grooves are one or more of the cavities.

In some embodiments, the body extends between two opposite body end surfaces.

In some embodiments, the grooves are spaced along the body between the two opposite body end surfaces.

In some embodiments, for each opposite body end surface, there are one or more of the cavities interposed between the body end surface and a groove of the plurality of grooves.

In some embodiments, each cavity of the plurality of cavities is for receiving a portion of at least one securing member for securing at least one cable in a groove of the plurality of grooves.

In some embodiments, the cavities are positioned to guide a securing member into contact with a cable such that the securing member secures at least a portion of the cable in a groove of the plurality of grooves at a point at which the securing member is substantially perpendicular to the groove.

In some embodiments, the cavities are holes that each begin at a respective first point on a surface of the body and extend through the body to a respective second point on the surface of the body.

In some embodiments, at least two of the holes intersect each other.

In some embodiments, for at least one pair of the holes, the pair of the holes are oppositely spaced from each other with each hole of the pair on a respective side of a groove of the plurality of grooves, and the pair of holes are directly across the groove from one another.

In some embodiments, the body comprises an elongated portion interposed between two opposite body end surfaces.

In some embodiments, the elongated portion comprises a circumferential surface that extends circumferentially around a longitudinal axis of the elongated portion.

In some embodiments, the grooves are in the circumferential surface.

In some embodiments, each groove extends circumferentially around at least a portion of the circumferential surface.

In some embodiments, the grooves are longitudinally spaced along the body between the opposite body end surfaces.

In some embodiments, between each pair of the grooves are a series of the holes that are circumferentially spaced around the circumferential surface.

In some embodiments, two of the circumferentially spaced holes intersect each other.

In some embodiments, the respective first point and the respective second point mentioned above are spaced substantially 180 degrees apart along the circumference of the circumferential surface.

In some embodiments, for at least one pair of the holes, the pair of the holes are longitudinally spaced from each other with each hole of the pair on a respective side of a groove.

In some embodiments, the pair of the holes are substantially aligned in a circumferential direction such that the pair of the holes are directly across the groove from one another.

In some embodiments, the cavities are notches. In some of such embodiments, the notches extend along a surface of the body in a direction that is either substantially 45 degrees to the grooves or substantially 90 degrees to the grooves.

In some embodiments, the at least one cable comprises a wire or a cord or an electrical link or an optical link or a transmission line for carrying at least one of data, electricity, and an optical signal.

In some embodiments, the securing member is flexible.

In some embodiments, the cable management apparatus further comprises at least one arm extending from the body for connecting the body to a supporting object.

According to another embodiment, there is provided a kit comprising a body and an arm. The body has a plurality of grooves. Each groove of the plurality of grooves is for receiving therein a portion of at least one cable. The body also has a plurality of cavities. Each cavity of the plurality of cavities is for receiving a portion of at least one securing member for securing the at least one cable to the body. The arm is for connecting the body to a supporting object.

According to another embodiment, there is provided a method for securing a cable that comprises: placing, into a groove of a plurality of grooves in a body of a cable management apparatus, at least a portion of a cable; inserting, into at least one cavity of a plurality of cavities in the body, at least a portion of a securing member; and securing the at least the portion of the cable in the groove of the body using the securing member.

BRIEF DESCRIPTION

Embodiments will now be described, by way of example only, with reference to the accompanying figures wherein.

Like reference numerals are used in different figures to denote similar elements.

DETAILED DESCRIPTION

The embodiments set forth herein represent information sufficient to enable those skilled in the art to practice the claimed subject matter and illustrate the best mode of practicing such subject matter. Upon reading the following description in light of the accompanying figures, those skilled in the art will understand the concepts of the claimed subject matter and will recognize applications of these concepts not particularly addressed herein. It should be understood that these concepts and applications fall within the scope of the disclosure and the accompanying claims.

Figure 1:
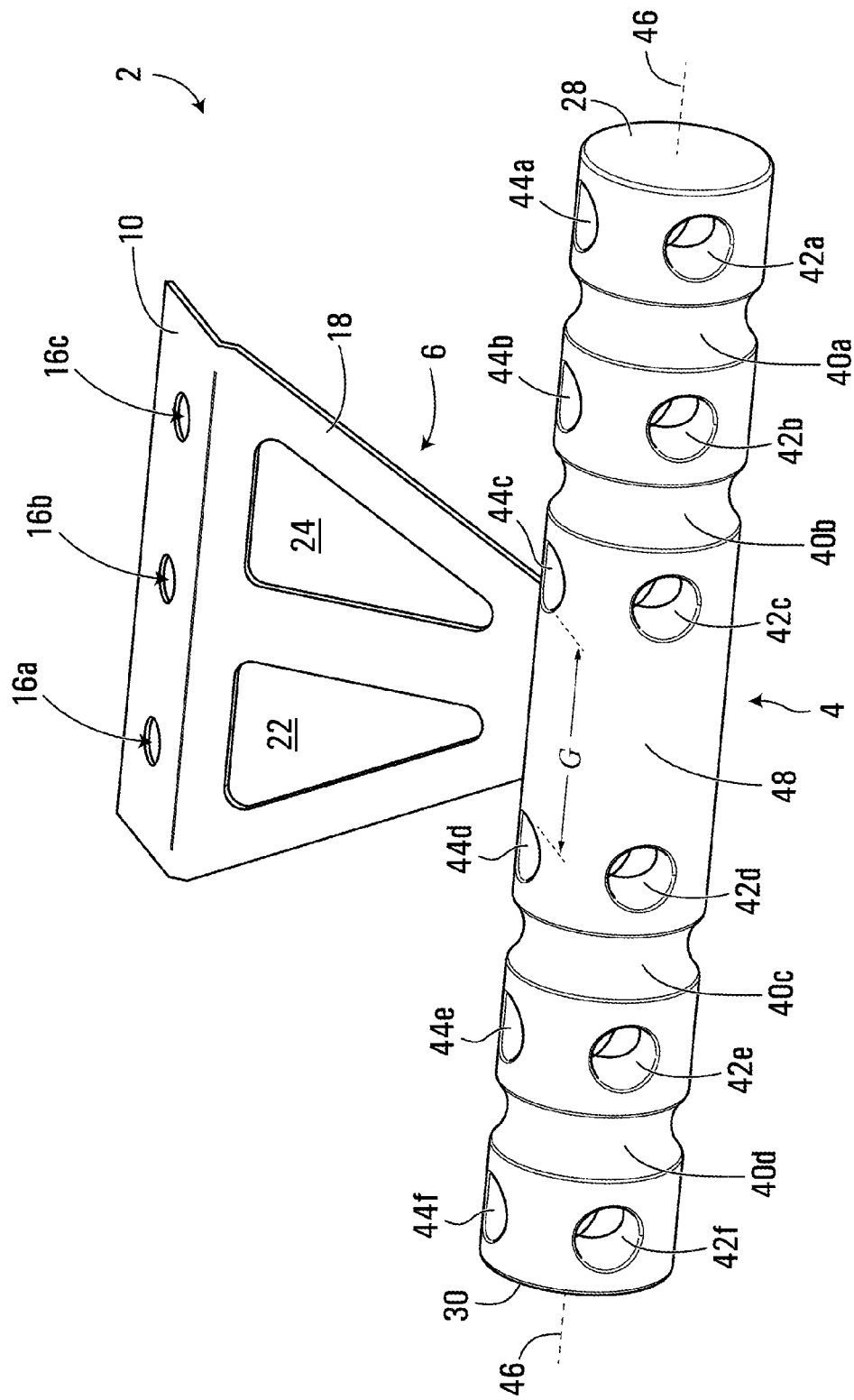
FIG. 1 is a perspective view of one embodiment of a cable management apparatus.
Figure 2:
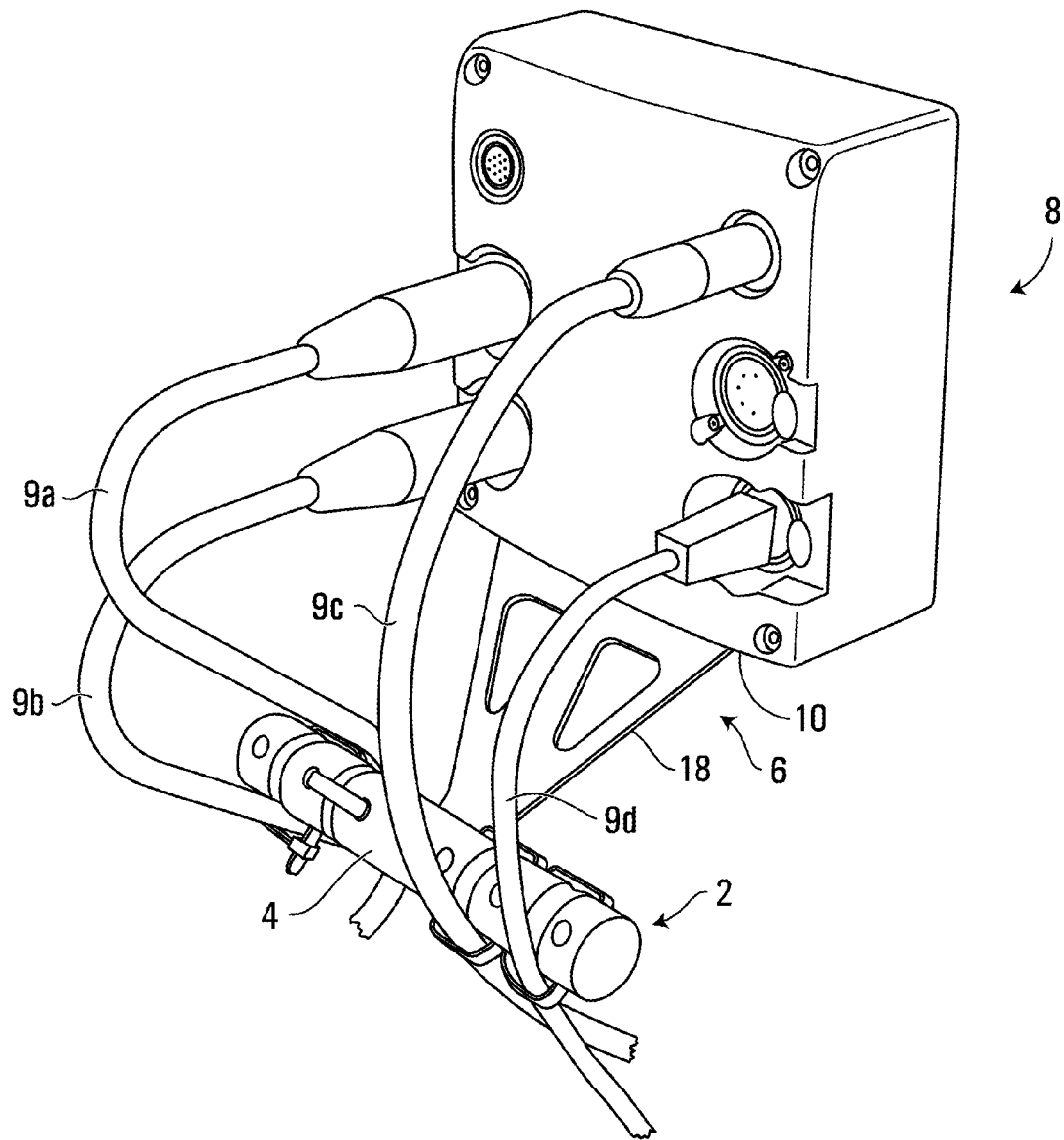
FIG. 2 illustrates equipment having a cable management apparatus connected thereto.

Referring first to FIG. 1, a perspective view of one embodiment of a cable management apparatus 2 is shown. The cable management apparatus 2 comprises a body 4 and an arm 6 extending from the body 4. The arm 6 is for connecting the body 4 to a supporting object, such as the surface of equipment to which a plurality of cables connect, or a surface of a chassis or another structure (e.g. a table, stand, or cabinet) on, near, or around the equipment. As an example, FIG. 2 illustrates equipment 8 having the cable management apparatus 2 connected thereto via arm 6. FIG. 2 also illustrates cables 9a to 9d, which connect to the equipment 8 and which are secured to the cable management apparatus 2. The securing of the cables 9a to 9d to the cable management apparatus 2 will be described later. The equipment 8 illustrated in FIG. 2 is an electronic box that attaches to the mechanical portion of a pan bar system for video production.

It will be appreciated that the cable management apparatus 2 may also be useful in relation to other types of equipment (e.g. other types of equipment in the video production industry, or equipment in data and communication networks, such as routers, servers, and switching equipment, or in avionics or medical equipment, for example).

With reference to FIGS. 1 and 2, the arm 6 of the cable management apparatus 2 is connected to the body 4 at one end, and at its opposite end the arm 6 comprises a mounting portion 10, which in this embodiment is in the form of a plate 10. The mounting plate 10 facilitates the mounting of the cable management apparatus 2 to the supporting object (e.g. to the equipment 8, as shown in FIG. 2).

Figure 3:
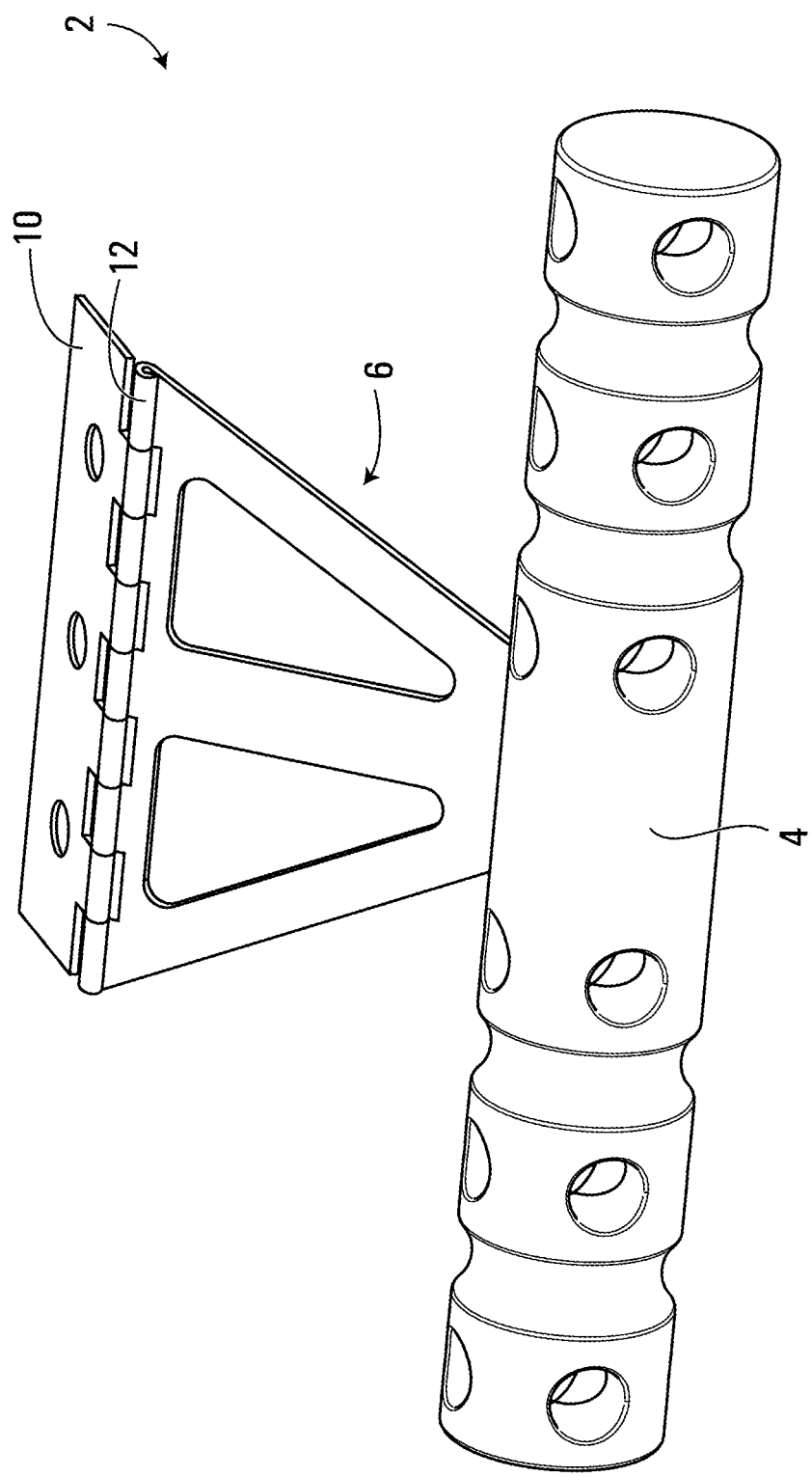
FIG. 3 is a perspective view of another embodiment of a cable management apparatus.
Figure 4:
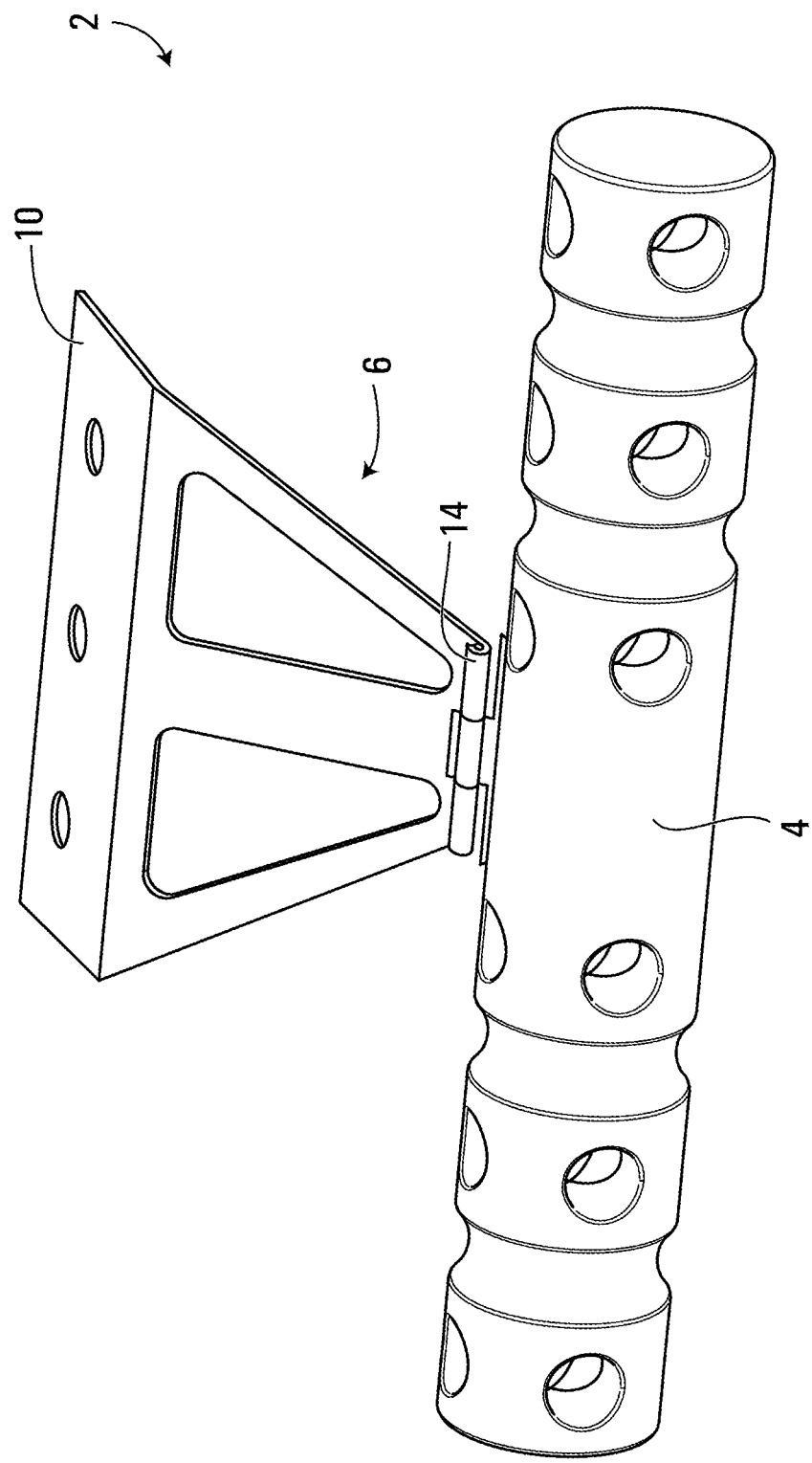
FIG. 4 is a perspective view of another embodiment of a cable management apparatus.

FIG. 3 is a perspective view of another embodiment of a cable management apparatus. With reference to FIG. 3, the mounting plate 10 may be hingedly connected to the arm 6 via hinge 12. The arm 6 may also (or instead) be hingedly connected to the body 4. For example, FIG. 4 illustrates a perspective view of another embodiment in which the arm 6 is hingedly connected to the body 4 via hinge 14. The presence of hinge 12 and/or hinge 14 can allow the spatial location of the body 4 to be dynamically adjusted once the cable management apparatus 2 is secured to its supporting object. In some embodiments, the hinge may be locked in place once the desired adjustment has been made. Also, although a hinge is illustrated, it will be appreciated that, more generally, any mechanism that can allow movement or pivoting (e.g. at a pivot point or line) can be used instead, such as (for example) a mechanical joint, swivel, or bearing.

Returning to FIG. 1, the mounting plate 10 comprises a plurality of holes 16a to 16c, through which fasteners such as bolts, screws, or nails (not shown) are passed to mount the cable management apparatus 2 to its supporting object. Fewer or more holes and fasteners could be provided in other embodiments. Also, alternative options include using adhesive, clips, or another method to mount the cable management apparatus 2 to its supporting object.

Although the cable management apparatus 2 could be permanently mounted to its supporting object, it is envisioned in this embodiment that the cable management apparatus 2 is removably mountable to the supporting object, thereby allowing the cable management apparatus 2 to be portable and moveable from one location to another. The mounting structure (i.e. the mounting plate 10 in the illustrated embodiment) facilitates moving the cable management apparatus 2 from one location to another, as the plate 10 can simply be detached from its supporting object and then reattached to another supporting object (or again to the same supporting object) at another location. In some applications, in moving the cable management apparatus 2 from one location to another, it may be the case that any cables attached to the cable management apparatus may not need to be removed from the cable management apparatus 2, but instead the cables may remain in place on the cable management apparatus 2, with the cables simply being disconnected from the equipment and then connected to the new equipment (or again to the same equipment) at the new location.

Figure 5:
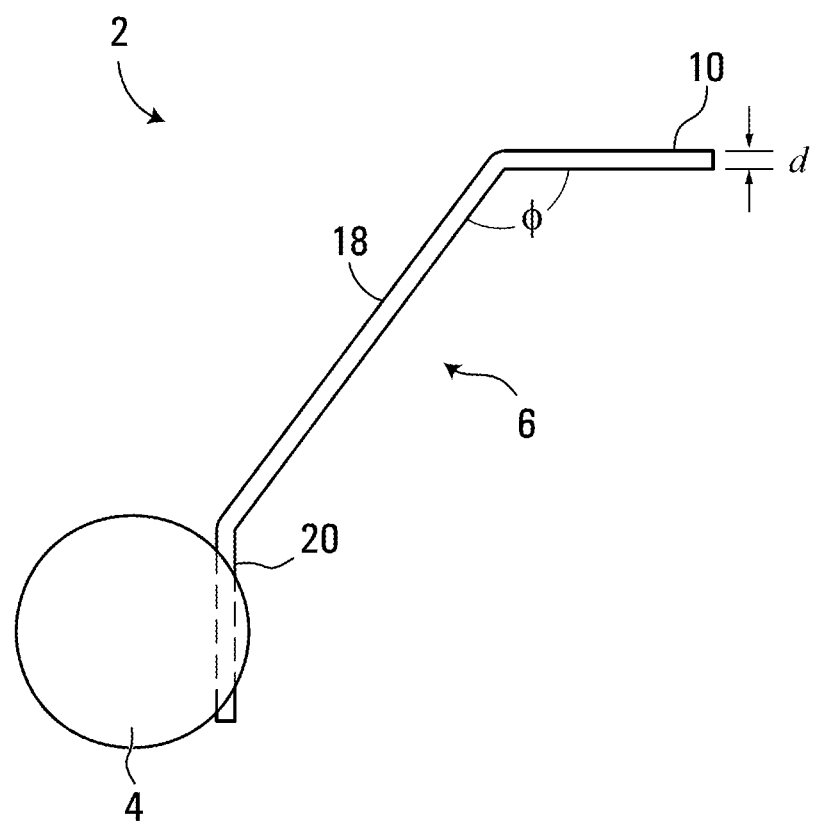
FIG. 5 is a side view of the cable management apparatus of FIG. 1.

FIG. 5 is a side view of the embodiment illustrated in FIG. 1. With reference to FIG. 5, the arm 6 comprises the mounting plate 10 at one end, a body connection portion 20 at the other end (which connects the body 4 to the arm 6), and a middle arm portion 18 extending between the mounting plate 10 and the body connection portion 20. Body connection portion 20 can either permanently or removably connect the body 4 of the cable management apparatus 2 to the arm 6. In this illustrated embodiment, the arm 6 has a thickness (defined by d in FIG. 5), which in some embodiments is chosen so that the amount of volume occupied by the arm 6 is reduced (so that the arm 6 is not too much in the way), and so that the amount of material needed to manufacture the arm 6 is reduced compared to having a thicker arm. Also (or instead), the thickness d of the arm 6 may be chosen so that the amount of volume occupied by the arm 6 is reduced, but the arm 6 is still suitably thick so that it does not easily bend. An example thickness d is 2-3 mm, depending on the application.

As also shown in FIG. 5, in this embodiment the middle arm portion 18 extends away from the mounting plate 10 at a non-zero angle $\phi$ relative to the mounting plate 10. In some embodiments, such as that illustrated, the middle arm portion 18 extends at an angle $\phi$ that is greater than 0 degrees and less than 90 degrees (i.e. $0<\phi<90°$). Such a configuration may help increase the radius of curvature of the cables secured to the cable management apparatus 2 (which is desired because a larger radius of curvature places less physical stress on the cables), while at the same time limiting how far the cable management apparatus 2 projects out in a direction parallel to the surface of the mounting plate 10 (which may cause the apparatus 2 to be in the way). To help understand this, please consider the example illustrated in FIG. 2. With reference to this figure, if the middle arm portion 18 instead extended at a 90 degree angle down relative to mounting plate 10 (i.e. perpendicular to the mounting plate 10), then the cables 9a to 9d would have a smaller radius of curvature, which is not as desirable. On the other hand, if the middle arm portion 18 instead extended at a 0 degree angle out relative to the mounting plate 10 (i.e. parallel to the surface of the mounting plate 10), then the cable management apparatus 2 would end up projecting out in front of the equipment 8 and may end up being in the way of a human accessing the equipment or another object in the vicinity of the equipment 8. An angle between 0 degrees and 90 degrees is used to balance these two competing objectives. For example, in the embodiment illustrated in FIG. 5, the middle arm portion 18 extends at a substantially 45 degree angle relative to the mounting plate 10 (i.e. $\phi \approx 45°$).

Figure 6:
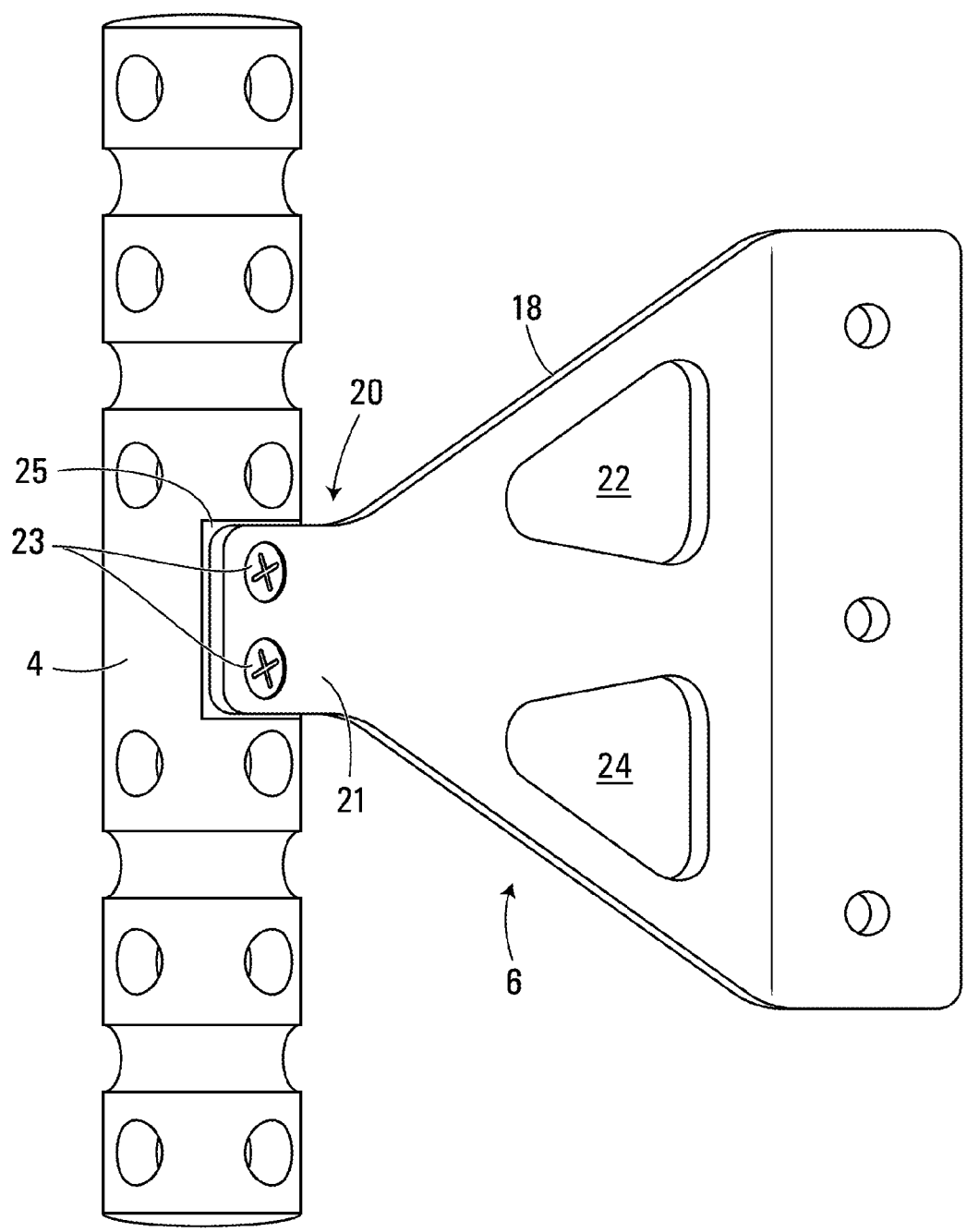
FIG. 6 is a bottom view of the cable management apparatus of FIG. 1.

FIG. 6 is a bottom view of the cable management apparatus 2. The body connection portion 20 of the arm 6 can be best seen in this figure. As is shown in FIG. 6, the body connection portion 20 comprises a mounting surface 21 with a pair of holes that each receive a fastener, such as a screw 23, to fasten the arm 6 to the body 4. The body 4 has a corresponding recessed section 25 for receiving the body connection portion 20. In this sense, the arm 6 may be considered to be "installed into" the body 4 in that body connection portion 20 of the arm 6 is received in recessed section 25 of the body 4. This may be more aesthetically pleasing. The mounting surface 21 of the arm 6 and the recessed section 25 of the body 4 are both flat surfaces so as to better facilitate the attachment of the arm 6 to the body 4. Also, having a flat mounting surface 21 of the arm 6 and corresponding flat recessed section 25 of the body 4 may be easier to manufacture compared to if the body 4 and/or arm 6 had to be shaped another way to interface the two pieces together.

As is also shown in FIG. 6, the middle arm portion 18 tapers in a direction towards the body connection portion 20. This has a benefit in that the spatial volume occupied by the arm 6 immediately adjacent the body 4 is reduced, thereby leaving more room for cables. The middle arm portion 18 also includes two holes 22 and 24, which has the benefit in that the holes 22 and 24 can allow one or more cables to be passed through the arm 6, if desired. The holes 22 and 24 also make it easier to secure a cable or another object to the arm 6, if desired. For example, a cable tie (or other securing member) could be fed through one of the holes 22 or 24, and then used to secure a cable or other object to the arm 6.

Figure 7:
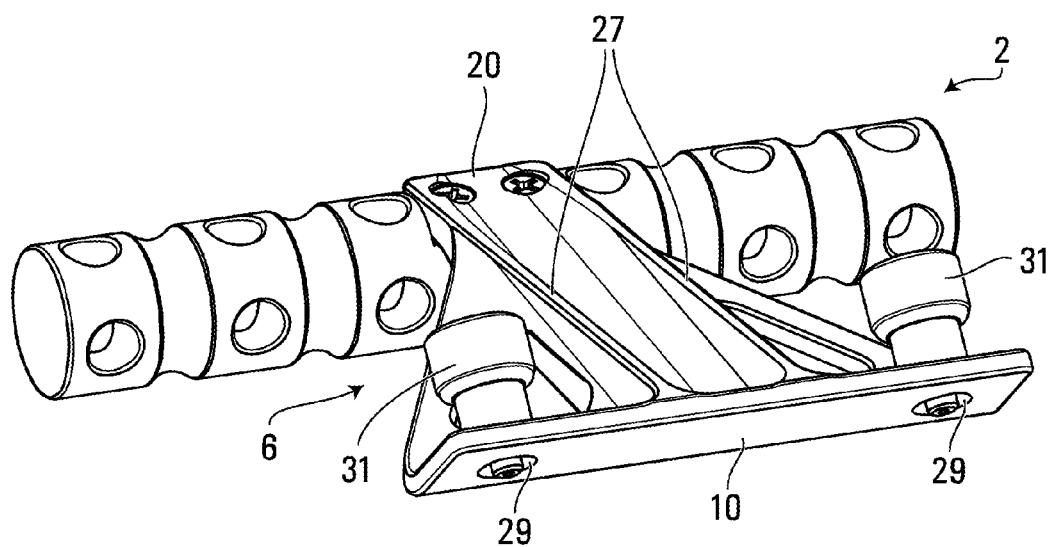
FIG. 7 illustrates another embodiment of a cable management apparatus.

The arm 6 illustrated in FIGS. 1 to 6 is only one example embodiment. Another embodiment is shown in FIG. 7 in which the arm 6 is slightly thicker than that shown in FIGS. 1 to 6 (e.g. thickness d is 3 mm instead of 2 mm), and the arm 6 has stiffening ribs 27 that project vertically from the underneath surface of the arm 6 and run along the arm 6 from the body connection portion 20 to the mounting plate 10. In this embodiment, the mounting plate 10 has two holes 29, each of which includes a captive fastener portion 31, which is for removably mounting the cable management apparatus 2 to a supporting object. Various types of captive fasteners are commercially available and may be used. Also, in the embodiment shown in FIG. 7, it is envisioned that the arm 6 is machined metal, rather than, for example, the alternative of using sheet metal. Machined metal may have increased strength compared to sheet metal, which may help reduce an amount of bending or physical distortion of the arm 6 if the arm 6 is accidentally hit, stepped on, or otherwise subject to an accidental distorting force.

Figure 8:
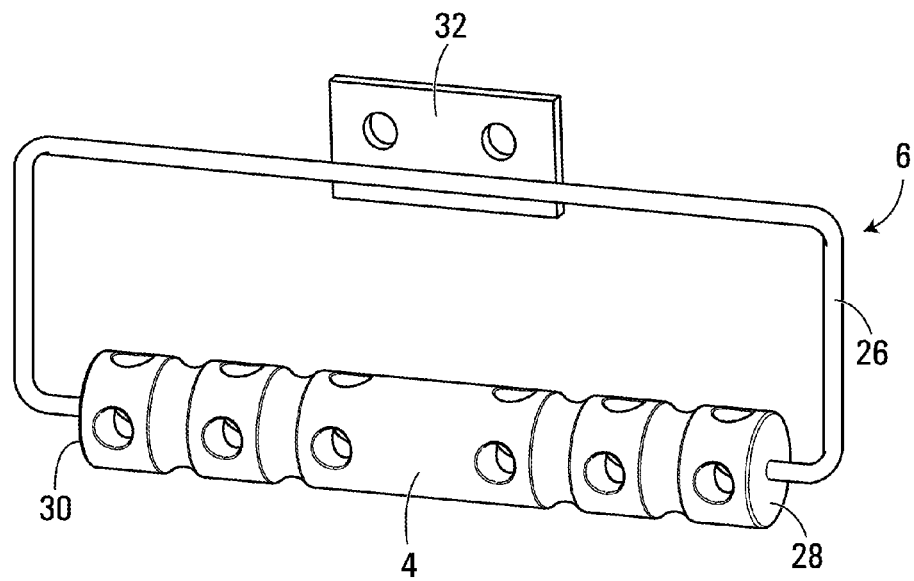
FIG. 8 is a perspective view of another embodiment of a cable management apparatus.
Figure 9:
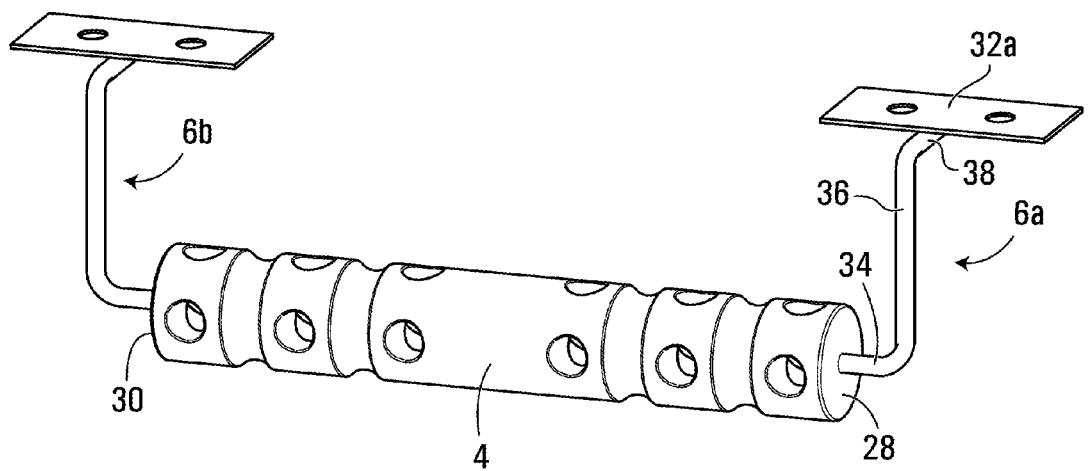
FIG. 9 is a perspective view of another embodiment of a cable management apparatus.

Other different types of arms could instead be used and are contemplated. To help show this, FIG. 8 illustrates an alternative embodiment (a perspective view) in which the arm 6 instead comprises a loop 26 that intersects the body 4 at opposite body ends 28 and 30 of the body 4. A mounting portion 32, again in the form of a plate in this example embodiment, is attached to the loop 26 opposite the body 4. As another example, FIG. 9 illustrates an alternative embodiment (a perspective view) in which there are two arms 6a and 6b. Arm 6a includes a body connection portion 34 that connects to one end 28 of the body 4, and the arm 6a initially extends away from and substantially perpendicular to the end 28 of the body 4. The body connection portion 34 of the arm 6a then takes a perpendicular jog to become middle arm portion 36, which connects the body connection portion 34 to a terminal portion 38. The terminal portion 38 is substantially perpendicular to the middle arm portion 36 and connects to a mounting portion 32a. Arm 6b is the mirror image of arm 6a and is connected to the opposite end 30 of the body 4.

Although not shown in the illustrated embodiments, the arm (or arms) can be extendable in some embodiments (e.g. using a sliding or telescoping mechanism), which would allow a user to adjust the distance between the body 4 and the mounting portion 10, 32, or 32a. The ability for the user to make such an adjustment may be beneficial in situations in which it is desired to place the body 4 either closer to or farther away from the supporting object, for example, to obtain a desired radius of curvature for one or more cables secured to the body 4, and/or to have the body 4 better positioned out of the way. Also, although mounting plates 10, 32, or 32a are illustrated, it will be appreciated that different mounting structures can be used instead (e.g. a male or female connector, hooks or loops, etc.). This will depend on the implementation and the structure to which the cable management apparatus is being mounted. Furthermore, different ways to construct the arm are envisioned. For example, in some embodiments the arm may be a monolithic portion made of steel, metal, or an alloy, or in other embodiments the arm may be made up of multiple pieces welded together or connected together in another manner (e.g. by fasteners such as bolts or screws).

It is clear from the above that many different arm configurations may be used.

The body 4 will now be described in detail.

Returning to FIG. 1, and with reference to this figure, the body 4 comprises a plurality of grooves 40a to 40d. Each groove 40a to 40d is recessed in the body 4 and is for receiving a portion of at least one cable therein. The body 4 also comprises a plurality of cavities, which in this embodiment are cylindrical holes 42a, 42b, 42c, 42d, 42e, 42f, 44a, 44b, 44c, 44d, 44e, and 44f. As explained later, each one of the holes 42a to 42f and 44a to 44f is for receiving therein a portion of at least one securing member for securing at least one cable to the body 4.

In the embodiment illustrated in FIG. 1, the body 4 is an elongated cylinder having a longitudinal axis 46. More specifically, the body 4 comprises two opposite body end surfaces 28 and 30 perpendicular to longitudinal axis 46, and a circumferential surface 48 interposed between the two opposite end surfaces 28 and 30 and extending circumferentially around the longitudinal axis 46. Each one of the grooves 40a to 40d extends around the circumferential surface 48 in a circumferential direction. The grooves 40a to 40d are longitudinally spaced along the body 4 between the opposite end surfaces 28 and 30. The grooves may be uniformly spaced in some embodiments and/or may be grouped or orientated in different directions or at different angles.

In the illustrated embodiment, there is a longitudinally extending section on the circumferential surface 48 near the arm 6 where there are no grooves. This is shown in FIG. 1 as gap G. In this gap G there are no grooves because the arm 6 connects to the body 4 in the vicinity of this gap G, and so a groove would be interrupted by the connection of the arm 6. However, it will be appreciated that in other embodiments grooves may exist in this gap G if the arm 6 is connected elsewhere. Also, in an alternative embodiment, one or more grooves could be present in gap G, with such grooves only circumferentially extending part way around the surface 48.

Each one of the holes 42a to 42f and 44a to 44f is adjacent to at least one of the grooves 40a to 40d. More specifically, in the illustrated embodiment, there is a plurality of holes on each side of each groove. Specifically, the body 4 comprises a series of the grooves 40a to 40d, with a series of holes in between each pair of neighbouring grooves. Each series of holes has its holes spaced circumferentially along the circumferential surface 48 of the body 4. For example, between neighbouring grooves 40a and 40b is a series of holes 42b and 44b, which are circumferentially spaced from each other. In this embodiment, they are circumferentially spaced apart by substantially 90 degrees. The use of two holes circumferentially spaced by substantially 90 degrees is implementation specific and depends at least in part on the circumference of the body 4. If the circumference of the body 4 were larger, then more holes could be included (e.g. holes circumferentially spaced 45 degrees apart instead).

There is also a series of holes interposed between each end surface 28 and 30 and a groove. Specifically, holes 42a and 44a are interposed between end surface 28 and groove 40a, and holes 42f and 44f are interposed between end surface 30 and groove 40d. Thus, it can be seen that there is a pattern of alternating holes and grooves.

Since the grooves 40a to 40d are spaced along the body 4 and separated by the holes, this causes there to be a spatial gap (in the longitudinal direction) between a pair of neighbouring grooves, which in turn causes there to be a spatial gap between a cable secured to one of the neighbouring grooves and another cable secure to the other of the neighbouring grooves. This may help better manage a plurality of cables compared to a track or tray in which cables are not spaced apart.

Figure 10:
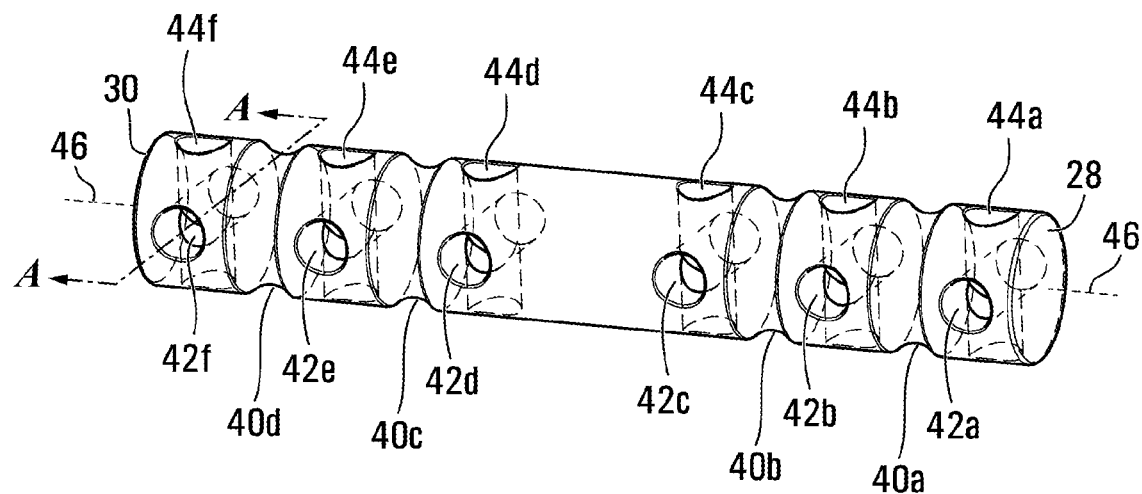
FIG. 10 illustrates a perspective view of the body of the cable management apparatus of FIG. 1.
Figure 11:
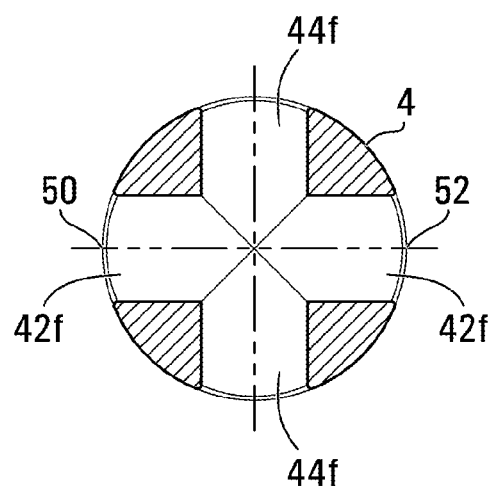
FIG. 11 is a cross-section of the body of FIG. 10 viewed from A-A in FIG. 10.

In the illustrated embodiment, each one of the holes 42a to 42f and 44a to 44f extends all the way through the body 4. This is best shown in FIGS. 10 and 11. FIG. 10 illustrates a perspective view of the body 4 in isolation, and FIG. 11 is a cross-section of the body 4 viewed from A-A in FIG. 10. Each one of the holes 42a to 42f and 44a to 44f radially extends perpendicular to the longitudinal axis 46, from a first point on the circumferential body surface (e.g. point 50 in FIG. 11) to a second point on the circumferential body surface (e.g. point 52 in FIG. 11), which is substantially 180 degrees circumferentially apart from the first point.

The holes are circumferentially spaced, and two circumferentially spaced holes intersect each other, as is best illustrated in FIG. 11. For example, as shown in FIG. 11, hole 42f intersects with hole 44f. This intersection of holes has a benefit in that it allows for a more compact design. For example, with reference to FIG. 10, if hole 42f and hole 44f were offset from each other along the longitudinal axis 46 of the body 4 so that they did not intersect, then extra space would be required between end surface 30 and groove 40d. Another benefit of having two holes intersect is that it allows for more options for securing a cable to the body 4, as will be explained later.

In the illustrated embodiment, each groove 40a to 40d has associated with it multiple pairs of holes, and for each of these pairs of holes, the holes are oppositely spaced directly across from one another with one hole on each side of a groove. That is, each pair of holes are spaced from each other in the longitudinal direction so that one hole is on each side of a groove, but the two holes are substantially aligned in the circumferential direction. For example, associated with groove 40d is a pair of holes 42e and 42f. These holes are on opposite sides of the groove 40d and directly across from each other (i.e. holes 42e and 42f are spaced from each other in the longitudinal direction so that holes 42e and 42f are on opposite sides of groove 40d, but holes 42e and 42f are substantially aligned with each other in the circumferential direction).

A manner in which cables can be secured to the cable management apparatus 2 will now be described.

Figure 12:
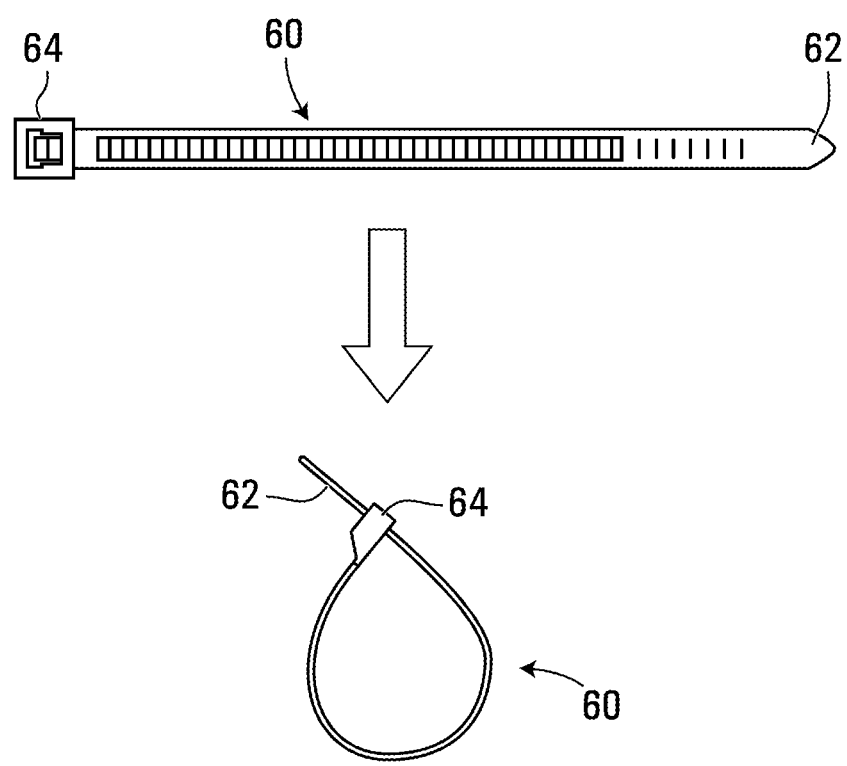
FIG. 12 illustrates a cable tie.

FIG. 12 shows a cable tie 60 that may be used to secure a cable to the cable management apparatus 2. Specifically, FIG. 12 shows both a top view of the cable tie 60 prior to use, and the cable tie 60 in a fastening position, in which the end 62 of the cable tie 60 is fed through slot 64. A cable tie 60 is an example of a securing member. More specifically, it is an example of a flexible securing member since the tie 60 is flexible.

Figure 13:
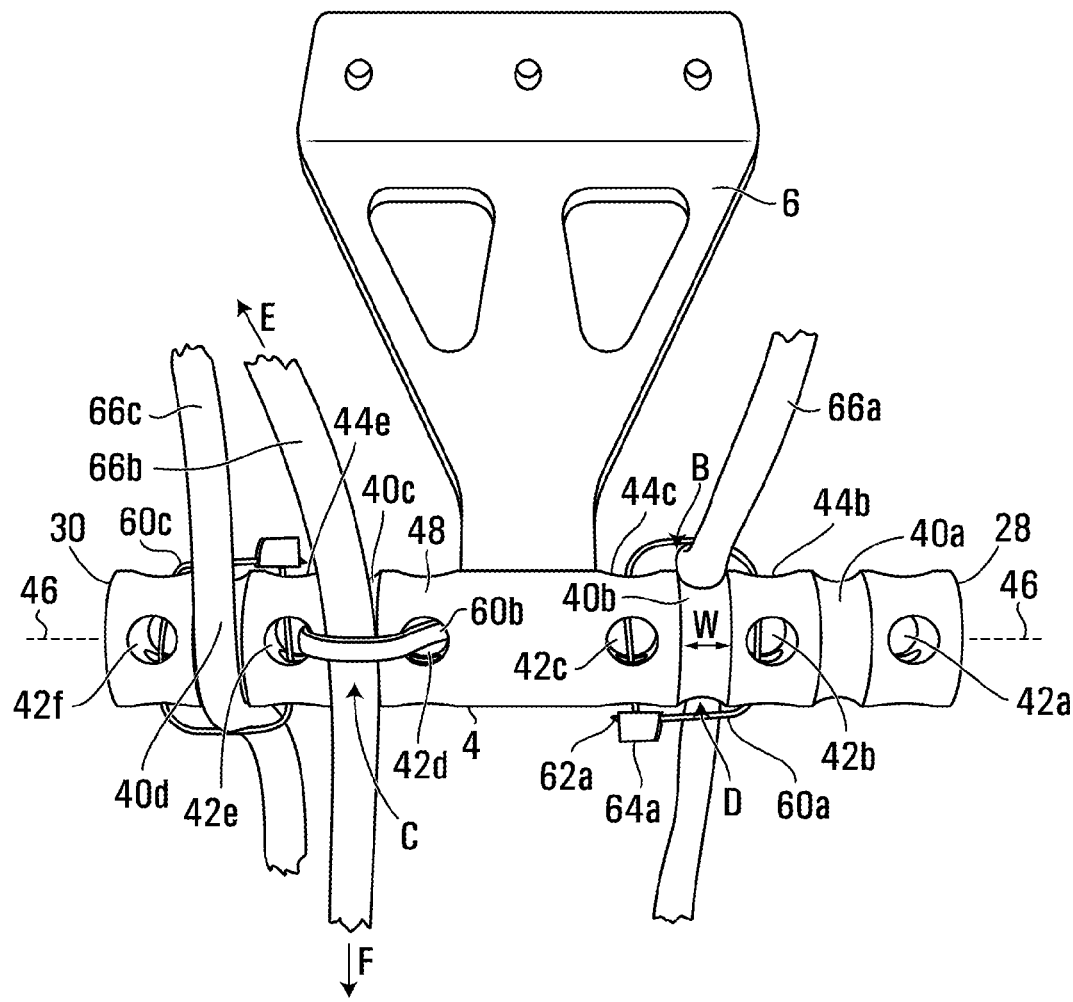
FIG. 13 illustrates an example of how cables may be secured to the body of a cable management apparatus.

FIG. 2 illustrates one example of cables connected to the cable management apparatus 2. FIG. 13 is another example, and the FIG. 13 example will be used to describe how cables may be secured to the body 4 of the cable management apparatus 2. With reference to FIG. 13, three cables 66a, 66b, and 66c are secured to the body 4 using respective cable ties 60a, 60b, and 60c. Please consider cable 66a first. A portion of cable 66a is received in groove 40b, as shown at B. Each end of cable tie 60a is then passed through respective holes 44b and 44c on opposite sides of groove 40b. The cable tie 60a is then secured by passing end 62a through slot 64a and tightening the cable tie 60a until the portion of cable 66a is held firmly in the groove 40b at B. Since the portion of the cable 66a is received in the groove 40b, the groove 40b helps support the cable 66a, which means that the cable tie 60a only needs to pass partially around cable 66a. That is, the cable tie 60a is not wrapped around the whole cable 66a, nor even most of the cable 66a, but only makes contact with the cable 66a over a portion of the cable 66a that is not within the groove 40b.

A similar process is performed to secure cables 66b and 66c to the body 4.

When a cable is secured to the body 4 using a groove in the manner explained above, the groove mitigates lateral movement of that cable along the body 4. That is, the groove mitigates movement of the cable in a direction parallel to the longitudinal axis 46 of the body 4. As an example, groove 40b mitigates lateral movement of cable 66a when tie 60a secures the portion of the cable 66a in the groove 40b at B, as shown in FIG. 13. The width W of groove 40b (and each of the other grooves) is implementation specific, but in some embodiments is at least no smaller than, and approximately the same size as, the width of the cable being received therein. For example, for a circular groove and circular cable (as illustrated), the radius of curvature of the groove may be substantially the same as or slightly larger than the radius of the cable expected to be received in the groove.

Also, since the groove mitigates lateral movement of the cable, there may be less friction generated at the point that the cable tie touches the cable, and therefore possibly less potential for damage.

Additionally, due to the grooves, a smaller portion of the cable's circumference makes contact with the cable tie compared to if the cable tie were instead wrapped around most of the cable. Because of this, and since the grooves mitigate lateral movement of the cables, there may also be less strain on a cable tie compared to if the cable tie were instead wrapped around most of the cable's circumference and used as the sole method for preventing movement of the cable. There may also be less strain on or damage to the cable. This is potentially a benefit compared to an alternative system in which the cables are instead attached to a straight flat surface on a bracket or tray with a cable tie being a specific length that is long enough to completely surround the cable, and with the cable tie being the only item keeping the cable in place. In such an alternative system, the cables could have more of a tendency to move laterally and/or rotate around the point that is connected by the cable tie, which may place strain on the cable and/or cable tie and may increase the risk of the cable tie breaking. If the cable became loose from the tray or bracket in such an alternative system, it could disconnect from the equipment or be damaged due to strain on the cable caused by the cable being bent too far beyond its minimum bending radius.

The specific arrangement of the holes in the body 4 of the illustrated embodiment allows for the cables to be firmly secured to the body 4. Specifically, each pair of holes oppositely spaced on each side of a groove and directly across from one another allows the cable tie to be guided by the holes to pass across the groove (and cable) substantially perpendicular to the groove, which results in the cable being more firmly held in the groove compared to if the cable tie did not pass across the groove (and cable) substantially perpendicular to the groove. For example, consider cable 66b held in groove 40c by tie 60b. The tie 60b passes through holes 42d and 42e, which are oppositely spaced on each side of groove 40c and are directly across from one another. The tie 60b is therefore guided by the holes 42d and 42e such that the tie 60b crosses the groove 40c at an angle substantially perpendicular to the groove 40c, as shown at C. This allows the cable 66b to be firmly held in the groove 40c. If holes 42d and 42e were instead circumferentially offset from one another (that is, if holes 42d and 42e were not directly across the groove 40c from one another, but instead one hole was offset relative to the other along the circumferential surface 48 of the body 4), then the tie 60b would cross the groove 40c at an angle that is not substantially perpendicular to the groove 40c, and the cable 66b would therefore not be held as firmly in the groove 40c. This is also why in FIG. 13 the tie 60b is not passed through holes 42d and 44e, but is instead passed through holes 42d and 42e. Of course it is possible to pass the tie 60b through holes 42d and 44e instead (for example) and still secure the cable 66b to the groove 40c. However, in FIG. 13, holes 42d and 42e are used to receive and guide tie 60b instead so as to result in the tie 60b passing over the groove 40c substantially perpendicular to the groove 40c, as illustrated at C. This allows the cable 66b to be more firmly secured in the groove 40c.

With the cables firmly secured as illustrated, if a cable is accidentally pulled, and the cable is secured to the body 4 at a point between the point at which the cable is pulled and the point at which the cable connects to the equipment, then the apparatus 2 will absorb force from the pull (e.g. the body 4 and/or arm 6 will absorb force), thereby reducing how much pull force is applied to the point at which the cable connects to the equipment. For example, consider cable 66b in FIG. 13. Assume that this cable 66b is an Ethernet cable that is connected to an Ethernet port (not shown) at point E in FIG. 13. Now assume a pulling force is accidentally applied to the cable 66b at point F in FIG. 13 in the direction of F. Since the cable 66b is firmly secured to the body 4 at point C, the apparatus 2 will absorb much of the force of the pull in direction F and thereby mitigate or eliminate any pull at point E, so as to prevent the cable 66b from accidentally being pulled out of the Ethernet port. A cable management apparatus could thus also provide strain relief.

As discussed above, passing each of ties 60a, 60b, and 60c through a respective pair of holes that are on opposite sides of a groove and directly across from one another allows for the tie to pass across the groove substantially perpendicular to the groove and thereby more firmly secure the cable in the groove. However, the use of intersecting holes allows for several other alternative securing options, if desired. For example, one could instead thread tie 60a through hole 42c, out hole 44c, in hole 42b, and out hole 44b and secure the cable 66a to the body 4 in that manner instead. This is only one example. It is clear that other options are also available. However, such alternative options may not secure cable 66a as firmly as the way shown in FIG. 13 in which holes 44b and 44c are used and the tie passes completely through holes 44b and 44c. The use of intersecting holes allows for various different options for securing a cable using a tie.

Although FIG. 13 only shows three cables being secured to the body 4, it will be appreciated that several other cables could also be secured to the body 4. For example, another cable could pass along groove 40b opposite cable 66a, at the point shown at D in FIG. 13, and tie 60a could then also secure this other cable in the groove 40b in addition to cable 66a. In this regard, it will be appreciated that every groove could be used to secure two different cables to the body 4, and even securing more cables may be possible. Also, although not illustrated, it is possible to also secure a cable longitudinally across the body 4. That is, have a cable secured to the body 4 such that a portion of the cable is parallel to longitudinal axis 46. Such a cable could be secured at both ends of the body 4, for example using holes 42a and 42f. In an alternative embodiment, not shown, the body 4 could have one or more longitudinal grooves therein, that is, one or more grooves parallel to longitudinal axis 46. This would assist in securing a cable parallel to the longitudinal direction and help prevent lateral (circumferential) movement of the cable.

Although the actual diameter of each one of the holes 42*a* to 42*f* and 44*a* to 44*f* is implementation specific, it is envisioned more generally in the illustrated embodiments that the holes have a diameter large enough to allow for the passage of two cable ties (as shown, for example, with respect to hole 42*e* in FIG. 13). Although not necessary, this may allow one to better fasten two adjacent cables on respective adjacent grooves. In some embodiments, the holes may be of different sizes (e.g. varying circumferences).

Also, although the size of the body 4 is implementation specific, it is envisioned more generally in the illustrated embodiments that the body is longer than it is wide. That is, the distance between the body ends 28 and 30 measured along the longitudinal axis 46 is greater than the diameter of the cylindrical body 4. Although not necessary, this has a potential benefit in that the body 4 may support multiple cables parallel to each other, while still being a more convenient size for placement on or near equipment.

The holes 42*a* to 42*f* and 44*a* to 44*f* are illustrated as being circular, but they could be another shape instead (e.g. square). In any case, the edges of holes 42*a* to 42*f* and 44*a* to 44*f* are preferably smooth or rounded (or otherwise provisioned) so as to mitigate sharp corners that could accidentally cut or chafe the cable ties. This could be done during manufacture by sanding the edges or otherwise smoothing out the surface of the edge of the holes to make them more rounded. Alternatively (or additionally), a grommet, sealant or eyelet could be added to the holes (e.g. as a sleeve, or to provide a smooth rim). The edges of the grooves are also preferably smooth to mitigate accidentally piercing or cutting the sheath or outer cladding of the cables.

Figure 14:
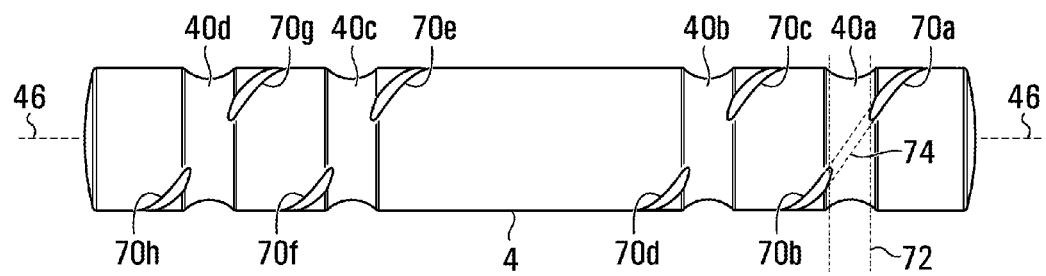
FIG. 14 illustrates a body of an alternative embodiment of a cable management apparatus.

Turning now to FIG. 14, an alternative embodiment of just the body 4 is illustrated in which the cavities in the body 4 are instead notches 70*a*, 70*b*, 70*c*, 70*d*, 70*e*, 70*f*, 70*g*, and 70*h*. A cable is secured to the body 4 by placing the tie circumferentially around the body 4 with at least one of the notches receiving the tie to help reduce or eliminate longitudinal movement of the tie. For example, to secure a portion of cable 72 in groove 40*a*, the portion of the cable 72 can be received in the groove 40*a*, and then a tie 74 is passed through notches 70*a* and 70*b* and around the circumference of the body 4. The tie 74 is tightened to hold the cable 72 in the groove 40*a*. The groove 40*a* mitigates lateral movement of the cable (i.e. movement of the cable 72 parallel to the longitudinal axis 46 of the body 4), and the notches 70*a* and 70*b* mitigate lateral movement of the tie 74 (i.e. movement of the tie 72 parallel to the longitudinal axis 46 of the body 4). In some embodiments, the notches may also be located on the other side of the body 4 (not shown) and/or the notches may be configured to extend around the circumference of the body 4 connecting to/intersecting the same or another groove at the other end of the notch.

Figure 15:
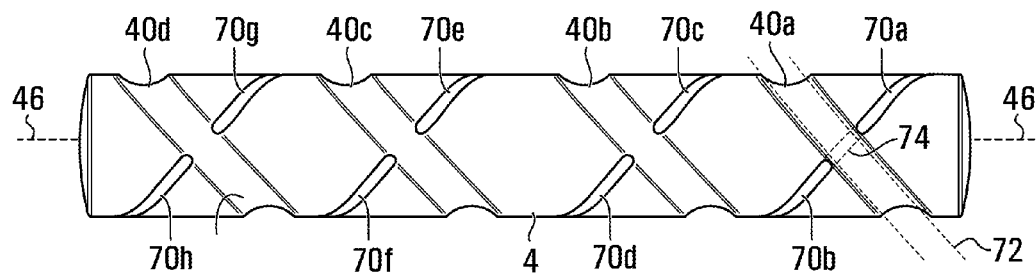
FIG. 15 illustrates a body of another alternative embodiment of a cable management apparatus.

In FIG. 14, the notches extend along the circumferential surface of the body 4 at an angle that is approximately 45 degrees relative to the grooves. This specific orientation is only one example. FIG. 15 illustrates a body 4 of another alternative embodiment of a cable management apparatus in which the grooves 40*a* to 40*d* are angled so that the notches extend along the circumferential surface of the body 4 at an angle that is approximately 90 degrees relative to the grooves. Therefore, when a tie (e.g. tie 74) is received in notches (e.g. notches 70*a* and 70*b*) and the tie passes over the groove (e.g. groove 40*a*), the tie passes over the groove approximately perpendicular to the groove so that the cable (e.g. cable 72) is more firmly secured.

In some embodiments, the notches may be deeper than the grooves. Also, in some embodiments, the notches may not intersect the grooves.

The cable management apparatus 2 thus illustrated has a body 4 that is cylindrical. This is only an example. One possible benefit of a cylinder is that it may be easier to machine manufacture. In the illustrated embodiments, the body 4 could be a machined workpiece made of steel, metal, or an alloy. However, the body 4 may instead be made in other ways, such as from a mould. Another possible benefit of a cylindrical body 4 is that it may assist in smoothly guiding the cables. However, non-cylindrical shapes are envisioned, such as (for example) rectangular, oval, square, elliptical, or spherical. In particular, in many embodiments, such as those illustrated above, a cable only makes contact with the body 4 over a relatively small area of the body 4. This helps allow the body 4 be amenable to another shape. Also, the arm 6 can be made of any suitable material, such as (for example) steel, metal, alloy, plastic, etc. The arm may be a single integrally formed piece or multiple separate pieces connected together.

In the embodiments described thus far, a primary function of the cable management apparatus 2 has been for the management of cables, as described and illustrated. It is envisioned that in certain applications, depending upon how the cable management apparatus 2 is mounted to the supporting surface, the cable management apparatus 2 may also function as a handle. For example, the cable management apparatus 2 may be secured to a particular piece of equipment at such a spatial orientation that the body 4 of the cable management apparatus also conveniently acts as a handle for moving the equipment. In such embodiments, the body 4 has a circumference sized to be comfortably gripped by a human hand. In the embodiment illustrated in FIG. 1, the diameter of the body 4 is envisioned as being 20 mm, but a diameter perhaps as small as 10 mm or perhaps as large of 50 mm may be suitable for allowing the body 4 to be comfortably gripped by a human hand, depending on the size of the hands handling the body 4 and/or depending on the specific shape of the body 4 (e.g. if it were instead oval). Other shapes for the body 4 (e.g. square or rectangular, or rectangular with rounded or oval ends or edges) are also contemplated and may also function as a handle.

In the embodiments described thus far, the cable management apparatus 2 has included an arm 6 for connecting the body 4 to a supporting surface or object. However, embodiments are also envisioned in which the arm 6 may not be present. For example, the cable management apparatus may only comprise a body (with no arm) directly connected to (or protruding from) a supporting surface or object.

Several embodiments are described above, with different variations mentioned. What is provided more generally is a cable management apparatus that comprises a body having both a plurality of grooves and a plurality of cavities. Each groove is for receiving therein a portion of at least one cable. Each cavity is for receiving a portion of at least one securing member for securing the at least one cable to the body.

Although the word "cable" is used herein, it will be appreciated that this encompasses any type of wire, cable, cord, or other physical link for transmitting power, data, and/or a signal, such as an electrical or optical signal.

The securing member may be flexible. Examples of flexible securing members include: a cable tie, tie, band, ribbon, belt, string, hook-and-loop fastener strip, rope, cord, strap, etc. The securing member could also be non-flexible, if suitably shaped. Brackets or other types of securing members, which could be flexible or non-flexible are also contemplated.

Examples of cavities include holes, notches, indents, depressions, gaps, voids, pockets, etc. In some embodiments, there may be more than one type of cavity (e.g. both holes and notches). If the cavities include one more holes, some or all of the one or more holes may be through-holes (i.e. begin at a first point on a surface of the body and extend through the body to a second point on the surface of the body).

In some embodiments, one or more of the grooves may be recessed in the body.

In some embodiments, between each pair of neighbouring grooves of the plurality of grooves are one or more of the cavities.

In some embodiments, the body may extend between two opposite body end surfaces. In such embodiments, the grooves may be spaced along the body between the two opposite body end surfaces.

In some embodiments, for each opposite body end surface, there are one or more cavities interposed between the body end surface and a groove.

In some embodiments, each cavity of the plurality of cavities is for receiving a portion of at least one securing member for securing at least one cable in a groove.

In some embodiments, the cavities are positioned to guide a securing member into contact with a cable such that the securing member secures at least a portion of the cable in a groove at a point at which the securing member is substantially perpendicular to the groove.

In some embodiments, the cavities are holes that each begin at a respective first point on a surface of the body and extend through the body to a respective second point on the surface of the body. In some of such embodiments, the respective first point and the respective second point may be spaced substantially 180 degrees apart along a circumference of the body. Other spacing is also possible.

In some embodiments, the cavities are holes, and at least two of the holes intersect each other.

In some embodiments, the cavities are holes, and wherein for at least one pair of the holes, the pair of the holes are oppositely spaced from each other with each hole of the pair on a respective side of a groove, and the pair of holes are directly across the groove from one another.

In some embodiments, the body comprises an elongated portion interposed between two opposite body end surfaces. In some of such embodiments, the elongated portion comprises a circumferential surface that extends circumferentially around a longitudinal axis of the elongated portion. In some of such embodiments, the grooves may be in (e.g. recessed in) or on the circumferential surface. A groove may extend circumferentially around at least a portion of the circumferential surface.

In some embodiments, the grooves may be longitudinally spaced along the body between opposite body end surfaces.

In some embodiments, the cavities are holes, and between each pair of the grooves are a series of the holes that are circumferentially spaced around a circumferential surface of the body.

In some embodiments, the cavities are holes, and two circumferentially spaced holes intersect each other.

In some embodiments, the cavities are holes, and for at least one pair of the holes, the pair of the holes are longitudinally spaced from each other along the body. In some of such embodiments, each hole of the pair may be on a respective side of a groove. In some of such embodiments, the pair of the holes may be substantially aligned in a circumferential direction such that the pair of the holes are directly across the groove from one another.

In some embodiments, the cavities are notches. In some of such embodiments, the notches may extend along a surface of the body in a direction that is substantially 45 degrees to the grooves. In other embodiments, the notches may extend along a surface of the body in a direction that is substantially 90 degrees to the grooves. Other angles (besides 45 degrees and 90 degrees) are also possible and are contemplated.

In some embodiments, the at least one cable comprises a wire or a cord or an electrical link or an optical link or a transmission line for carrying at least one of data, electricity, and an optical signal.

In some embodiments, the cable management apparatus may also comprise at least one arm extending from the body for connecting the body to a supporting object.

In some embodiments, the cavities are holes, and the holes are positioned so that there is a series of holes in between each pair of neighbouring grooves.

In some embodiments, the body may comprise a series of the grooves, with one or more of the cavities in between a pair of neighbouring grooves.

In some embodiments, the body may comprise a series of the grooves, with one or more of the cavities in between each pair of neighbouring grooves.

In some embodiments, the cavities are holes, and the holes extend between two faces of the body.

In some embodiments, the cavities are holes, and the holes are radially extending. The holes may extend perpendicular to a longitudinal axis of the body. The holes may be circumferentially spaced. Two circumferentially spaced holes may intersect each other.

In some embodiments, the body may comprise a series of the grooves, with a series of the cavities in between each pair of neighbouring grooves.

In some embodiments, each side of each groove has at least one cavity (e.g. hole or notch) adjacent to the groove.

In some embodiments, the cavities are shaped to guide a securing member so that the securing member can make contact with a cable and secure that cable to the body at a point at which the securing member is substantially perpendicular to both the cable and the groove that has received the cable. The securing member may be flexible.

In some embodiments, the body is cylindrically-shaped and comprises two opposite end surfaces perpendicular to a longitudinal axis of the body, and a circumferential surface interposed between the two opposite end surfaces and extending circumferentially around the longitudinal axis.

In some embodiments, the grooves may be in (e.g. recessed in) a circumferential surface of the body. The grooves may extend circumferentially along the circumferential surface. The grooves may be longitudinally spaced along the body between the opposite end surfaces. The cavities may be holes, and the holes may radially extend through the body. Each hole may be adjacent to at least one groove. Each hole may begin at a first point on the circumferential surface, extend through the body, and out a second point on the circumferential surface. A hole may extend in a radial direction. The first point and the second point may be spaced substantially 180 degrees apart along the circumference of the body.

In some embodiments, the body comprises a series of the grooves, with a series of the holes in between each pair of neighbouring grooves. In some of such embodiments, each series of holes may comprise a sequence of holes that are spaced circumferentially along a circumferential surface of the body. The holes may extend radially and fully through the body.

In some embodiments, the body has two opposite end surfaces, and for each opposite end surface, there is a series of cavities interposed between the end surface and a groove.

In some embodiments, the body may be integrally formed.

In some embodiments, the length of the body between opposite end surfaces of the body is longer than the diameter of the body.

In some embodiments, the cavities are circular holes.

In some embodiments, the body includes an alternating pattern of grooves and cavities.

In some embodiments, the cable management apparatus further comprises at least one arm extending from the body for connecting the body to a supporting object. The arm may be extendable. The arm may include a mounting face or mounting plate (or more generally a mounting portion) for interfacing with a surface of the supporting object. The mounting portion may be hingedly connected to the at least one arm. In some embodiments, the at least one arm may be connected to the body at opposite end surfaces or on circumferential surface of the body. The at least one arm may be hingedly connected to the body. In some embodiments, the arm comprises stiffening ribs. In some embodiments there is a single arm and the arm has at least one hole, such as (for example), for receiving a portion of a securing member to secure an item to the arm.

In another embodiment, there is provided a kit for assembling a cable management apparatus, and more specifically, any of the cable management apparatuses described herein. In one embodiment, the kit comprises the body of the cable management apparatus and the arm. For example, in one embodiment the kit comprises: (i) a body having a plurality of grooves, each groove of the plurality of grooves for receiving therein a portion of at least one cable, and the body also having a plurality of cavities, each cavity of the plurality of cavities for receiving a portion of at least one securing member for securing the at least one cable to the body; and (ii) an arm for connecting the body to a supporting object.

Figure 16:
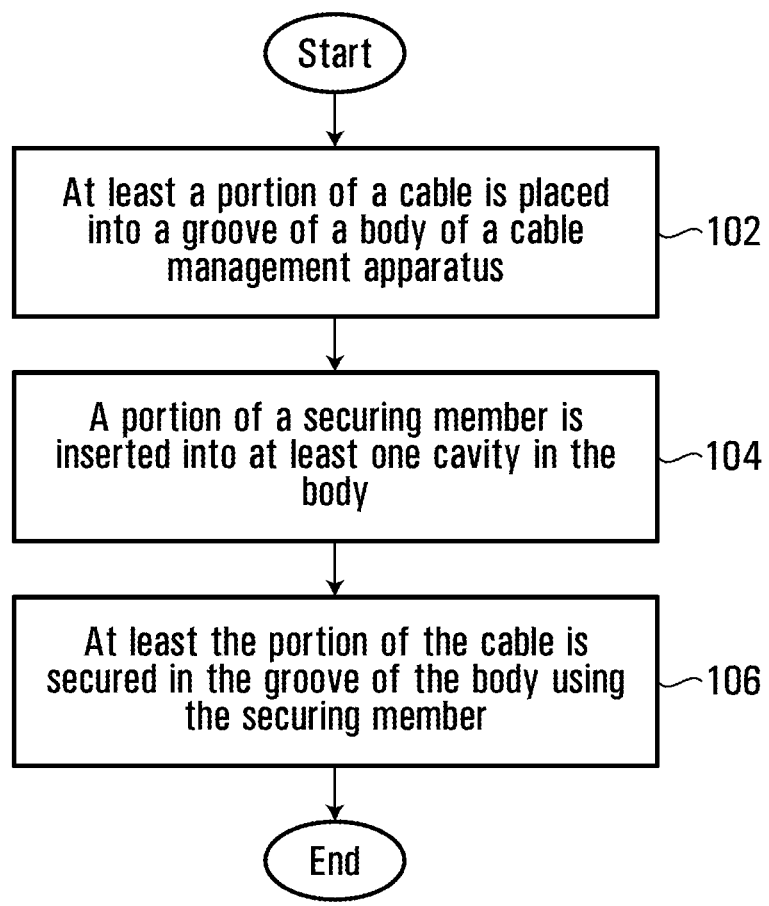
FIG. 16 illustrates a method of securing a cable to a cable management apparatus.

In another embodiment, a method of securing a cable to any one of the cable management apparatuses described herein is provided. An example method is described with reference to FIG. 16. In step 102, at least a portion of a cable is placed into a groove of a body of a cable management apparatus. The body has a plurality of grooves. In step 104, a portion of a securing member is inserted into at least one cavity in the body. The body has plurality of cavities. In step 106, the at least the portion of the cable is secured in the groove of the body using the securing member. Although FIG. 16 shows a "Start" and an "End", the steps 102, 104, and 106 could be repeated for multiple cables.

Although the foregoing has been described with reference to certain specific embodiments, various modifications thereof will be apparent to those skilled in the art without departing from the scope of the claims appended hereto.

The invention claimed is:

1. A cable management apparatus comprising:
a body having a plurality of grooves, each groove of the plurality of grooves for receiving therein a portion of at least one cable; the body also having a plurality of cavities, each cavity of the plurality of cavities for receiving a portion of at least one securing member for securing the at least one cable to the body;
wherein the body comprises an elongated portion interposed between two opposite body end surfaces, the elongated portion comprising a circumferential surface that extends circumferentially around a longitudinal axis of the elongated portion; and
wherein the grooves are in the circumferential surface, wherein each groove extends circumferentially around at least a portion of the circumferential surface, and wherein the grooves are longitudinally spaced along the body between the opposite body end surfaces.

2. The cable management apparatus of claim 1, wherein between each pair of neighbouring grooves of the plurality of grooves are one or more of the cavities.

3. The cable management apparatus of claim 2, wherein for each opposite body end surface, there are one or more of the cavities interposed between the body end surface and a groove of the plurality of grooves.

4. The cable management apparatus of claim 3, wherein the cavities are notches.

5. The cable management apparatus of claim 4, wherein the notches extend along the circumferential surface in a direction that is either substantially 45 degrees to the grooves or substantially 90 degrees to the grooves.

6. The cable management apparatus of claim 1, wherein each cavity of the plurality of cavities is for receiving a portion of at least one securing member for securing at least one cable in a groove of the plurality of grooves.

7. The cable management apparatus of claim 1, wherein the cavities are positioned to guide a securing member into contact with a cable such that the securing member secures at least a portion of the cable in a groove of the plurality of grooves at a point at which the securing member is substantially perpendicular to the groove.

8. The cable management apparatus of claim 1, wherein the cavities are holes that each begin at a respective first point on the circumferential surface and extend through the body to a respective second point on the circumferential surface.

9. The cable management apparatus of claim 8, wherein at least two of the holes intersect each other.

10. The cable management apparatus of claim 8, wherein for at least one pair of the holes, the pair of the holes are oppositely spaced from each other with each hole of the pair on a respective side of a groove of the plurality of grooves, and the pair of holes are directly across the groove from one another.

11. The cable management apparatus of claim 8, wherein between each pair of the grooves are a series of the holes that are circumferentially spaced around the circumferential surface, and wherein two of the circumferentially spaced holes intersect each other.

12. The cable management apparatus of claim 8, wherein the respective first point and the respective second point are spaced substantially 180 degrees apart along the circumference of the circumferential surface.

13. The cable management apparatus of claim 8, wherein for at least one pair of the holes, the pair of the holes are longitudinally spaced from each other with each hole of the pair on a respective side of a groove, and the pair of the holes are substantially aligned in a circumferential direction such that the pair of the holes are directly across the groove from one another.

14. The cable management apparatus of claim 1, wherein the at least one cable comprises a wire or a cord or an electrical link or an optical link or a transmission line for carrying at least one of data, electricity, and an optical signal.

15. The cable management apparatus of claim 1, wherein the securing member is flexible.

16. The cable management apparatus of claim 1, further comprising at least one arm extending from the body for connecting the body to a supporting object.

17. The cable management apparatus of claim 1, wherein the body is cylindrical.

18. A kit comprising:
- a body having a plurality of grooves, each groove of the plurality of grooves for receiving therein a portion of at least one cable; and the body also having a plurality of cavities, each cavity of the plurality of cavities for receiving a portion of at least one securing member for securing the at least one cable to the body; and
- an arm for connecting the body to a supporting object;
- wherein the body comprises an elongated portion interposed between two opposite body end surfaces, the elongated portion comprising a circumferential surface that extends circumferentially around a longitudinal axis of the elongated portion; and
- wherein the grooves are in the circumferential surface, wherein each groove extends circumferentially around at least a portion of the circumferential surface, and wherein the grooves are longitudinally spaced along the body between the opposite body end surfaces.

19. The kit of claim 18, wherein the body is cylindrical.

20. A method comprising:
- placing, into a groove of a plurality of grooves in a body of a cable management apparatus, at least a portion of a cable;
- inserting, into at least one cavity of a plurality of cavities in the body, at least a portion of a securing member;
- securing the at least the portion of the cable in the groove of the body using the securing member;
- wherein the body having the groove in which the portion of the cable is secured comprises an elongated portion interposed between two opposite body end surfaces, the elongated portion comprising a circumferential surface that extends circumferentially around a longitudinal axis of the elongated portion; wherein the grooves are in the circumferential surface, wherein each groove extends circumferentially around at least a portion of the circumferential surface, and wherein the grooves are longitudinally spaced along the body between the opposite body end surfaces.

* * * * *